United States Patent [19]
Gorin

[11] Patent Number: 5,794,193
[45] Date of Patent: Aug. 11, 1998

[54] AUTOMATED PHRASE GENERATION

[75] Inventor: Allen Louis Gorin, Berkeley Heights, N.J.

[73] Assignee: Lucent Technologies Inc., Murray Hill, N.J.

[21] Appl. No.: 528,577

[22] Filed: Sep. 15, 1995

[51] Int. Cl.$^6$ ............................................... G10L 5/06
[52] U.S. Cl. ..................... 704/250; 704/254; 704/251; 704/257
[58] Field of Search ........................... 395/2.52, 2.59, 395/2, 2.4, 2.62; 379/67, 76

[56] References Cited

U.S. PATENT DOCUMENTS

| | | | |
|---|---|---|---|
| 4,866,778 | 9/1989 | Baker | 395/2.52 |
| 5,033,088 | 7/1991 | Shipman | 395/2.52 |
| 5,384,892 | 1/1995 | Strong | 395/2.52 |
| 5,390,279 | 2/1995 | Strong | 395/2 |
| 5,434,906 | 7/1995 | Robinson et al. | 379/67 |

OTHER PUBLICATIONS

Gorin et al., ("Automated Call Routing in a Telecommunications Network", 2nd IEEE Workshop on Interactive Voice Technology for Telecommunications Applications, Kyoto Research park, Kyoto, Japan, Sep. 26–27, 1994, pp. 137–140).

Gorin et al., ("An Experiment in Spoken Language Acquisition", IEEE Transactions on Speech and Audio Processing, vol. 2, No. 1, Part II, Jan. 1994, pp. 224–240).

Gorin et al., ("On Adaptive Acquisition of Spoken Language", Neural Networks for Signal processing, Aug. 1991, pp. 422–431).

Miller et al., ("A Structured Network Architecture for Adaptive Language Acquisition", ICASSP'92: Acoustics, Speech & Signal Processing Conference, vol. 1, 1992, pp. 201–204).

Cole et al., ("The Challenge of Spoken Language Systems: Research Directions for the Nineties", IEEE Transactions on Speech and audio processing, Jan. 1995, vol. 3, Issue 1, pp. 1–21).

Primary Examiner—David R. Hudspeth
Assistant Examiner—Vijay B. Chawan

[57] ABSTRACT

A methodology for automated task selection is provided, where the selected task is identified in natural speech of a user making such a selection. A set of meaningful phrases are determined by a grammatical inference algorithm which operates on a predetermined corpus of speech utterances, each such utterance being associated with a specific task objective, and wherein each utterance is marked with its associated task objective. Each meaningful phrase developed by the grammatical inference algorithm can be characterized as having both a Mutual Information value and a Salience value (relative to an associated task objective) above a predetermined threshold.

11 Claims, 3 Drawing Sheets

FIG. 1

ERRORS IN DETECTING BILLING CREDIT QUERIES

FALSE DETECTIONS yes i need a sprint operator I_NEED_CREDIT_EOS
yes i have a number here and i don't know if it's A_WRONG_NUMBER...
i was trying to get 612 xxx xxxx and it said it WAS_DISCONNECTED...

MISSED DETECTIONS i am trying to call wooster and the number i have rings to a different number
i'm going to blame this one on my wife i misread her handwriting
i'm dialing 215 xxx xxxx and i keep getting bells and things like that
i'm calling a long distance number in the 201 area code it just went booo boooo booo

FIG. 2

CORRECT DETECTIONS OF BILLING CREDIT QUERIES i placed a call and i GOT_A_WRONG_NUMBER earlier this afternoon
yes i MISDIALED a number
I_WAS_CUT_OFF when trying to call this number
I_WAS_DIALING 1 xxx xxx xxxx and i got someone else
yes operator I_JUST_DIALED AN_INCORRECT_NUMBER
yes i would like TO_GET_CREDIT_FOR a number i called

FIG. 3

DETECTING BILLING CREDIT REQUESTS VIA SALIENT PHRASES

| CLASSIFICATION RATE P(CREDIT\|phrase) | COVERAGE P(phrase\|CREDIT) | PHRASE |
|---|---|---|
| 0.92 | 0.48 | wrong |
| 0.98 | 0.41 | wrong number |
| 0.95 | 0.45 | wrong (number\|eos\|call) |
| 0.97 | 0.42 | (a\|the\|was) wrong (number\|eos\|call) |
| 0.95 | 0.50 | F(wrong)\|F(dialed) |
| 0.95 | 0.57 | F(wrong)\|F(dialed)\|F(credit) |
| 0.95 | 0.59 | previous\|F(disconnected) |
| 0.95 | 0.64 | previous\|F(misdialed)\|F(cut off) |

| MUT INF | PHRASE FRAGMENTS | MAX PROB | ACTION |
|---|---|---|---|
| 7.4 | MADE A LONG DISTANCE | 0.93 | CREDIT |
| 7.3 | LONG DISTANCE | 0.55 | (CREDIT) |
| 7.1 | I WOULD LIKE | 0.24 | |
| 6.9 | AREA CODE | 0.65 | (AREA CODE) |
| 6.3 | COULD YOU TELL ME | 0.37 | |
| 5.6 | THE AREA CODE FOR | 0.92 | AREA CODE |
| 5.3 | I'M TRYING | 0.33 | |
| 5.0 | A WRONG NUMBER | 0.98 | CREDIT |
| 4.9 | A LONG DISTANCE CALL | 0.62 | (CREDIT) |
| 4.8 | THE WRONG NUMBER | 0.98 | CREDIT |
| 4.8 | A NUMBER IN | 0.29 | |
| 4.4 | I'M TRYING TO | 0.33 | |
| 4.3 | LONG DISTANCE CALL | 0.62 | (CREDIT) |
| 4.3 | TRYING TO | 0.30 | |
| 4.3 | I JUST MADE A | 0.93 | CREDIT |
| 4.1 | I'D LIKE TO | 0.18 | |
| 4.0 | TO MAKE A CALL | 0.24 | |

AUTOMATED PHRASE GENERATION

CROSS REFERENCE TO RELATED APPLICATION

This application is related to U.S. patent application Ser. No. 08/528,578 entitled "Automated Call Router System and Method", (GORIN-6-1-1-18), said related application being concurrently filed with the present application, having at least one common inventor, and being incorporated herein by reference.

BACKGROUND OF THE INVENTION

A. Field of the Invention

This invention relates to speech processing, and more particularly to a system and method for automated generation of salient phrases related to a desired task to be performed.

B. Background Art

In communications networks there are many instances where it is desirable to provide for automated implementation of particular tasks desired by a user of such a network—i.e., implementation of such a task without human intervention on the part of the network. In the prior art, such automated task implementation is generally carried out via a plurality of menu choices which must be selected by designated signals from a user, general numeric signals generated by a keypad associated with a user's telephone set, and in some cases by the user pronouncing such numerals. In many cases such menu-based automated task implementation arrangements involve multi-tiered menus. Such multi-tiered menu structures are generally unpopular with users and remarkably inefficient at achieving the desired objective. The percentage of successful routings though such a multi-tiered menu structure can be quite low, in some cases less than 40 percent. Stated differently, in such circumstances, more than 60 percent of the attempts to accomplish a particular task through access via such a multi-tiered menu structure might be either terminated without the user having reached the desired objective or else defaulted to an operator (or other manned default station).

To address these limitations in the prior art, it would be desirable to provide a means for understanding and acting upon spoken input from people. In traditional speech understanding systems, meaningful words, phrases and structures have been manually constructed, involving much labor and leading to fragile systems which are not robust in real environments. A major objective, therefore, would be a speech understanding means which is trainable, adaptive and robust—i.e., a methodology for automatically learning the language for a desired task.

SUMMARY OF INVENTION

A methodology for automated task selection is disclosed where the selected task is identified in natural speech of a user making such a selection. A fundamental aspect of the methodology of the invention is a determination of a set of meaningful phrases. Such meaningful phrases are determined by a grammatical inference algorithm which operates on a predetermined corpus of speech utterances, each such utterance being associated with a specific task objective, and wherein each utterance is marked with its associated task objective. Each meaningful phrase developed by the grammatical inference algorithm can be characterized as having both a Mutual Information value and a Salience value (relative to an associated task objective) above a predetermined threshold. Upon determination of the set of meaningful phrases, a recognition function is implemented to extract instances of such meaningful phrases appearing in a user's natural speech addressed to the desired selection. Such recognized meaningful phrases from the users input speech are then acted on by a classification function which operates to identify and implement the desired task objective.

BRIEF DESCRIPTION OF THE DRAWINGS

FIG. 1 provides illustrative examples of false and missed detection by a classifier for an automated call routing system based on use of "meaningful phrases".

FIG. 2 provides illustrative examples of correct detection by a classifier for an automated call routing system based on use of "meaningful phrases".

FIG. 3 depicts an illustrative example of the advantage provided by the "meaningful phrase" classification parameter of the system of the invention.

DETAILED DESCRIPTION OF INVENTION

Figure 4:
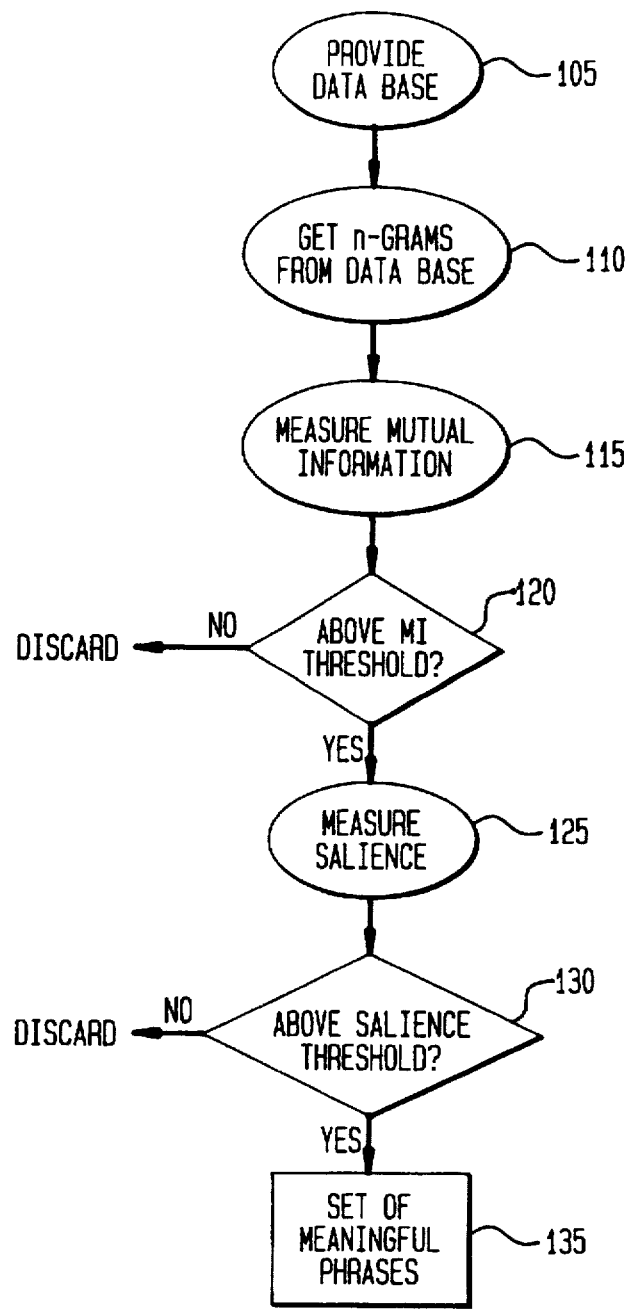
FIG. 4 depicts the methodology of the invention in flow chart form.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

It is important as well that the distinction between the method of operations and operating a computer, and the method of computation itself should be kept in mind. The present invention relates to methods for operating a computer in processing electrical or other (e.g., mechanical, chemical) physical signals to generate other desired physical signals.

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 5 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A fundamental objective of the invention is a task selection methodology involving communication between a human user and machine, that shifts the burden of understanding a specialized vocabulary from the user to the machine operator. Thus, in a generalized embodiment, the invention is represented as a task selection methodology in a communications environment having the following characteristics:

First, a user will be presented with a greeting similar to "How may I help you?"

After the user responds to that greeting with a natural speech statement of the user's objective (such as the implementation of a desired task), the user's request may be classified into one of a number of predefined task objectives, with that task objective being then implemented.

In the preferred embodiment of the invention described hereafter, implementation of the methodology of the invention will from time-to-time be illustrated by reference to an exemplary application of that methodology in the form of requests from a user for tasks to be carried out by a telephone system. In such an exemplary application, task objectives for a user may include call billing options (e.g., collect, third-party), dialing information, billing questions, credit requests (as for a wrong or mis-dialed number), area codes, etc.

I. Description of the Preferred Embodiment

In prior art communications environments, a user is often required to know separate numbers and/or dialing patterns to access different tasks or services available at a given communications destination, as well as possibly having to navigate a menu-driven system which then routes the user to a desired objective. With the methodology of the invention, the user is able to access a central number and the user's objective will be implemented by the communications recipient on the basis of its content.

An example of such content-based routing would be where a caller responds to a "how may I help you" prompt with I want to reverse the charges, whence the appropriate action is to connect the caller to an automated subsystem which processes collect calls. Another example would be a caller response of I am having a problem understanding my bill, in which case the caller should be connected to the telephone carrier's business office. The system thus needs to understand spoken language to the extent of routing the call appropriately.

A. Baseline Approach

The basic construct of a methodology such as disclosed herein has been described by one of the inventors in Gorin, A. "On automated language acquisition", *J. Acoust. Soc. Am.*, 97 3441–3461, (June, 1995) [hereafter referred to as Gorin 95], which is incorporated herein and made a part hereof. A number of considerations from that baseline approach are material to the method of the invention. Certain of those considerations will be briefly reviewed hereafter. As a preface to that review, it is to be noted that, in the approach of Gorin 95, the classification parameter for determination of an association between input text or speech and one of a set of predefined task objectives is implemented as salient words derived from a corpus of speech utterances having marked associated task objectives. In the adaptation of that methodology described herein, the classification parameter is implemented as meaningful phrases derived from a corpus of speech utterances having marked associated routing objectives.

Central to the approach here is a database of a large number of utterances, each of which is related to one of a predetermined set of routing objectives. This database forms an input to a classification parameter algorithm. Preferably, such utterances will be extracted from actual user responses to a prompt of "How may I help you?" (or similar words to the same effect). Each utterance is then transcribed and labeled with one of the predetermined set of routing objectives. Illustrative utterances from the database utilized by the inventors are as follows:

Yeah, I want to reverse the charges

I was just disconnected from this number

I was trying to hang-up

I am trying reach Mexico

Charge this to my home phone

In a related article co-authored by one of the inventors [Gorin, A. L., Hanek, H., Rose R. and Miller, L., "Spoken Language Acquisition for Automated Call Routing", in *Proceedings of the International Conference on Spoken Language Processing* (ICSLP 94), Yokohama (Sep. 18–22, 1994)] [hereafter Gorin 94A], it is noted that the distribution of routing objectives in such a data base may be substantially skewed. The implications of such skewing may well be taken into account in the determination of the particular set of routing objectives to be supported on an automated bases by the system of the invention.

A salience principle as related to the system of the invention has been defined in another article co-authored by one of the inventors [Gorin, A. L., Levinson, S. E. and Sankar, A. "An Experiment in Spoken Language Acquisition," *IEEE Trans. on Speech and Audio*, Vol. 2, No. 1, Part II, pp. 224–240 (January 1994)] [hereafter Gorin 94]. Specifically, the salience of a word is defined as the information content of that word for the task under consideration. It can be interpreted as a measure of how meaningful that word is for the task. Salience can be distinguished from and compared to the traditional Shannon information content, which measures the uncertainty that a word will occur. As is known, such traditional information content can be estimated from examples of the language, while an estimation of salience requires both language and its extra-linguistic associations.

B. Adaption of Baseline Approach

As previously noted, the baseline methodology of Gorin 95 (which has been incorporated herein by reference) uses as a classification parameter words from test speech utterances which have a salient association with particular task objectives. The adaptation of that baseline approach which constitutes the methodology of the invention represents an improvement over that baseline methodology, primarily through the use of meaningful phrases as the classification parameter. Before describing the nature of that improvement, or the methodology for determining such meaningful phrases, it is useful to define two types of error experienced in such an automated call routing system and a related "success" concept:

False detection of a task objective occurs when a salient (meaningful) phrase related to one task objective is detected in a user's input speech when the user's actual request was directed to another task objective. The probability of such a false detection occurring will hereafter be referred to by the designation: $P_{FD}$.

Missed detection of a task objective occurs when the user's input speech is directed to that task objective and none of the salient words (or meaningful phrases) which are associated with that task objective are detected in the input speech. The probability of such a missed detection occurring will hereafter be referred to by the designation: $P_{MD}$ Coverage for a task objective refers to the number of successful translations of request for a task objective to that task objective, relative to the total number of input requests for that task objective. As an illustrative example, a task objective for which 60 successful translations occurred out of 100 input requests for that task objective would be said to experience 60% coverage. It is noted that Coverage=$1-P_{MD}$ Of the two error types defined above, one is significantly more "costly" than the other. The consequence of a false detection error is the routing of a user to a different task objective than was requested by the caller. Such a result is at least very annoying to the user. The possibility also exists that such an error can result in a direct cost to the system provider—an annoyed customer or potential customer being classified here as an indirect cost—through some non-system error resulting from the user being connected to an incorrect task objective. The consequence of a missed detection error, on the other hand, is simply the routing of the user to a default operator position and the only cost is the lost opportunity cost of not handling that particular call on an automated basis. Thus, while ideally the probabilities of both missed detection and false detection would be near zero, it is far more important that this objective be realized for false detection errors. As will be seen below, there are circumstances where tradeoffs must be made between minimizing one or another of these error probabilities, and this principle will be applied in such circumstances.

FIG. 1 provides several illustrative examples of False Detections and Missed Detections from the database of speech utterances used by the inventors. While basis for error in each of these examples is believed to be largely self-explanatory, the error in the first example in each set will be briefly described. In the first example under False Detection, the meaningful phrase is I_NEED_CREDIT_EOS, and thus this phrase would have been classified as a request for credit. However, from reading the entire utterance, it is apparent that the caller actually wanted to be transferred to another carrier (the carrier receiving this request being AT&T). In the first example under Missed Detections, there are no meaningful phrases identified in the utterance (and therefore no basis for classifying the caller's objective), although it is apparent from reading the utterance that the caller is seeking a billing credit. As a comparative illustration, FIG. 2 shows several examples of correct detection of a billing credit objective from meaningful phrases in the input speech.

A very significant advantage resides in the use of meaningful phrases as the classification parameter by the methodology of the invention, relative to the use of salient words in the baseline methodology described in Gorin 95. With the use of words as the classification parameter, the word choices for detecting a given routing objective may be highly limited in order to achieve a minimum probability of false detection—i.e. use of only words having a near 100% likelihood of predicting the intended routing objective—and therefore the coverage for such a routing objective is likely to be very low, leading to a high probability of missed detection errors occurring. With meaningful phrases as a classification parameter, on the other hand, both low probability of false detection and low probability of missed detection are achievable.

FIG. 3 provides an illustrative example of this advantage. That figure shows the Classification Rate and the Coverage for an exemplary task objective, Billing Credit, as the phrase used for the classification parameter grows in length and/or complexity. The Classification Rate is defined as the probability of the routing objective (CREDIT) having been requested, given the occurrence of the selected phrase in the input speech (i.e., P(CREDIT | phrase). Similarly, the Coverage term is defined as the probability of the selected phrase appearing in the input speech, given that the designated routing objective (CREDIT) has been requested. In the Phrase column, parenthesis surrounding a series of terms separated by " | " indicate one of those terms appearing in the indicated position with other terms in that row. The nomenclature "F(Wrong)" indicates a grammar fragment surrounding the word "wrong", the phrase in the fourth row of that column being representative of such a grammar fragment surrounding a salient word. The designation "previous" indicates a carry forward of everything on the preceding line. And finally, the abbreviation "eos" indicates "end of sentence"

C. Description of Methodology of Invention

The methodology of the invention is graphically illustrated in the flow chart of FIG. 4. Following the steps of that flow chart, a database of speech utterances labelled with a requested objective is provided at step 105, and that database is accessed at step 110 to extract a set of n-grams. The mutual information of those n-grams is determined at step 115 and the MI values so determined are compared with a predetermined threshold at step 120. n-grams having an MI value below the threshold are discarded and those above the threshold are operated on by salience measuring step 125. In step 130 those salience values are compared with a predetermined salience threshold and those n-grams having a salience value below the threshold are discarded. n-grams passing the salience threshold test are stored at step 135 as the set of meaningful phrases.

D. Determination of Meaningful Phrases

As will be understood at this point, a fundamental focus of this invention is that of providing a device which learns to understand and act upon spoken input. It will be apparent that the ultimate goal of such a speech understanding system will be to extract meaning from the speech signal. Moreover, as was shown in Gorin 95, for systems which understand spoken language, the semantic aspects of communications are highly significant. Not surprisingly, such semantic considerations are fundamental to the development of the meaningful phrases used as classification parameters in the system of the invention.

The determination of the meaningful phrases used by the invention is founded in the concept of combining a measure of commonality of words and/or structure within the language—i.e., how often groupings of things co-occur—with a measure of significance to a defined task for such a grouping. In the preferred embodiment of the invention, that commonality measure within the language is manifested as the mutual information in n-grams derived from a database of training speech utterances and the measure of usefulness to a task is manifested as a salience measure. Other manifestations of these general concepts will be apparent to those skilled in the art.

As is known, mutual information ("MI"), which measures the likelihood of co-occurrence for two or more words, involves only the language itself. For example, given *War and Peace* in the original Russian, one could compute the mutual information for all the possible pairings of words in that text without ever understanding a word of the language in which it is written. In contrast, computing salience involves both the language and its extra-linguistic associations to a device's environment. Through the use of such a combination of MI and a salience factor, phrases may be selected which have both a positive MI (indicating relative strong association among the words comprising the phrase) and a high salience value.

The meaningful phrase determination is implemented in a Grammatical Inference ("GI") algorithm. That GI algorithm searches the set of phrases which occur in the training database using as a selection criteria both the mutual information (within the language) of a phrase and a measure of the salience of the phrase for a task under consideration. In its general form the GI algorithm carries out the following steps.

1. n=number of words in a phrase to be evaluated.
2. Set n=1.
3. Generate a list of phrases of length n from training database.
4. Evaluate commonality of those phrases (as function of frequency/probability) and salience of the phrases.
5. Select subset according to a predetermined threshold.
6. Generate list of phrases of length n+1 by expanding the set of phrases on length n.
7. Evaluate mutual information and salience for the phrases generated in step 6.
8. Select subset according to a predetermined threshold.
9. Set n=n+1
10. Go to step 6.

The algorithm may be carried out to any level of n desired and the selection threshold may be varied up or down with successive iterations to vary the output of the algorithm. That output will be a set of meaningful phrases.

An exemplary output of this algorithm is shown in FIG. 7. In that figure, the exemplary meaningful phrases are shown along with the MI value, the salience value, and the Action to which the meaningful phrase is directed at the probability value shown. Note that the Max Probability (sometimes designated $P_{max}$) is used as a proxy for the salience value. That Max Probability is defined as the maximum of the distribution of probabilities of each action, given the phrase under consideration, which probabilities are determined by a sub-step of the GI algorithm.

E. Exemplary Structure for Invention

Figures 5, 6:
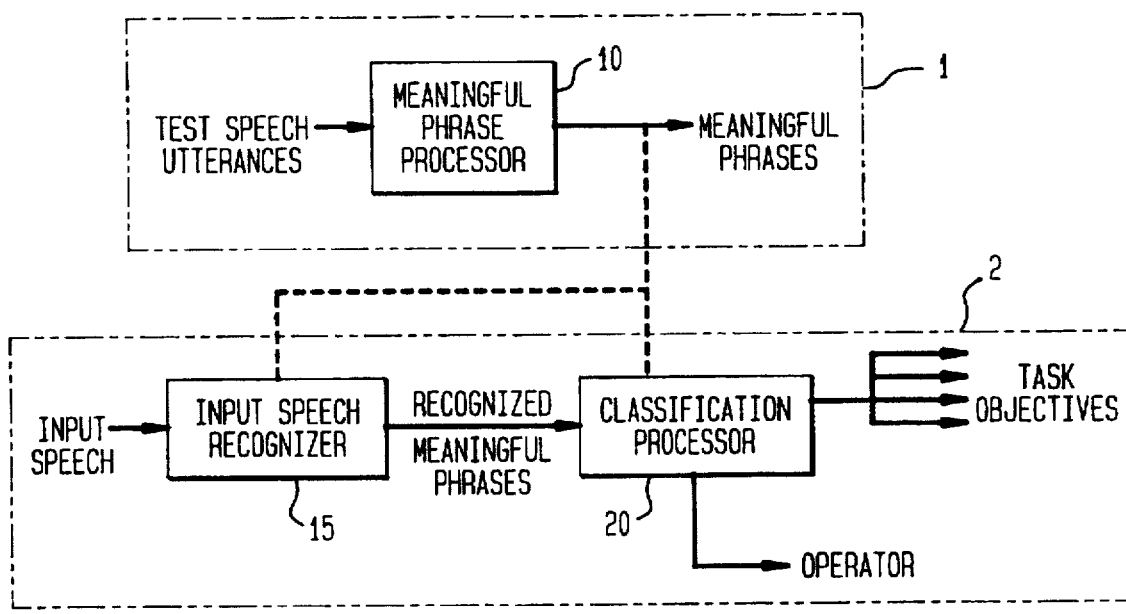
FIG. 5 presents in block diagram form the structure of the system of the invention.
FIG. 6 provides illustrative examples of "meaningful phrases" determined according to the invention.

FIG. 5 shows in block diagram form an exemplary structure for carrying out the methodology of the invention. As can be seen from the figure, that structure comprises two related subsystems: Meaningful phrase generation subsystem 1 and Input speech classification subsystem 2. As already described, Meaningful phrase generation subsystem 1 operates on a database of a large number of utterances each of which is related to one of a predetermined set of task objectives, where each such utterance is labeled with its associated task objective. The operation of this subsystem is essentially carried out by Meaningful phrase processor 10 which produces as an output a set of meaningful phrases having a probabilistic relationship with one or more of the set of predetermined task objectives with which the input speech utterances are associated. The operation of Meaningful phrase processor 10 is generally determined in accordance with the previously described grammatical inference algorithm.

Operation of Input speech classification subsystem 2 begins with the inputing of a user's task objective request, in the user's natural speech, to Input Speech Recognizer 15. That Input Speech Recognizer may be of any known design and performs the function of detecting, or spotting, the existence of one or more meaningful phrases in the input speech. As can be seen in the figure, the meaningful phrases developed by Meaningful phrase generation subsystem 1 are provided as an input to Speech Recognizer 15.

The output of Speech Recognizer 15, which will comprise the recognized meaningful phrase(s) appearing in the caller's task objective request, is provided to Classification Processor 20. That Classification Processor may apply a confidence function, based on the probabalistic relation between the recognized meaningful phrase(s) and selected task objectives, and makes a decision to implement a particular task objective or a determination that no such decision is likely, in which case the user may be defaulted to an operator position.

As will thus be apparent, the meaningful phrases developed by Meaningful phrase generation subsystem 1 are available to Input Speech Recognizer 15, for defining the phrases which the Recognizer is programmed to spot, and to Classification Processor 20, for defining the task objectives related to meaningful phrases input from Speech Recognizer 15 and, if warranted, for establishing a level of confidence for a relation of such input meaningful phrase(s) to a particular task objective.

CONCLUSION

A novel methodology for automated task selection has been disclosed which facilitates a search for a classification parameter in natural speech, that classification parameter being manifested as a set of meaningful phrases, which are themselves defined in terms of mutual information and a salience factor. An important advantage of the methodology of the invention is that the vocabulary and grammar are unconstrained, being acquired during the course of performing the methodology.

While prior art language recognition systems have been very much handcrafted and lacking in robustness, the methodology of the invention brings an automated training procedure to the language recognition function—automated procedures for determining meaningful phrases in test speech utterances marked with associated task objectives.

Although the present embodiment of the invention has been described in detail, it should be understood that various changes, alterations and substitutions can be made therein without departing from the spirit and scope of the invention as defined by the appended claims.

I claim:

1. A method for automated determination of a classification parameter for a selected task, where said selected task is expressed in natural speech of a user, comprising the steps of:

providing a database of speech utterances, each said utterances being characterized as directed to ones of a predetermined set of tasks;

forming from ones of a plurality of said speech utterances a set of speech phrases, each said phrase containing at least one word;

determining a likelihood measure for co-occurrence of constituent words in each of said phrases;

selecting from said set of phrases a subset thereof having a value of said likelihood measure exceeding a predetermined threshold;

determining a significance measure relative to a specified one of said predetermined set of tasks for phrases in said selected subset of said phrases;

selecting from said selected subset of said phrases a set of meaningful phrases having a value of said significance measure exceeding a predetermined threshold, said meaningful phrases constituting said classification parameter.

2. The method for automated determination of a classification parameter of claim 1 wherein said likelihood measure is manifested as a mutual information measure.

3. The method for automated determination of a classification parameter of claim 1 wherein said significance measure is manifested as a salience measure.

4. The method for automated determination of a classification parameter of claim 3 wherein said salience measure is represented as a conditional probability of said task being selected given said speech phrase, said conditional probability being a highest value in a distribution of said conditional probabilities over said set of predetermined tasks.

5. The method for automated determination of a classification parameter of claim 1 wherein said speech utterances are generated in response to a query of a form "How may I help you?".

6. The method for automated determination of a classification parameter of claim 1 wherein each of said speech utterances is labelled with a one of said predetermined set of tasks to which each said utterance is directed.

7. The method for automated determination of a classification parameter of claim 1 wherein said first selecting step and all subsequent steps are iteratively repeated for speech phase of size n words, where n is an integer in a range $1 \leq n \leq N$, N being selected by an implementer of said method.

8. A method for establishing a classification relationship between at least one speech phrase and a one of a predetermined set of task objectives, wherein each said speech phrase is formed from a one of a known corpus of speech utterances and each said speech utterance in said corpus is related to a one of said predetermined set of task objectives, said method comprising the steps of:

generating a plurality of said speech phrases, each having a predetermined number of words, from said corpus;

evaluating a mutual information measure and a salience measure for each said generated speech phrase relative to a given one of said task objectives;

selecting a portion of said plurality of said speech phrases having said mutual information measure and said salience measure above predetermined thresholds;

generating from said corpus a second plurality of said speech phrases using said selected portion as a base, wherein each said speech phrase in said second plurality contains at least one additional word relative to said number of words comprising said speech phrases generated by the initial generating step;

evaluating a mutual information measure and a salience measure for each said speech phrase in said second plurality of said speech phrases relative to said given one of said task objectives;

selecting a portion of said second plurality of said speech phrases having said mutual information measure and said salience measure above predetermined thresholds;

iteratively repeating the immediately preceding generating, evaluating and selecting steps until a set of speech phrases having a desired relationship with said given one of said task objectives is selected.

9. The method for establishing a classification relationship of claim 8 wherein said salience measure is represented as a conditional probability of said task being selected given said speech phrase, said conditional probability being a highest value in a distribution of said conditional probabilities over said set of predetermined tasks.

10. The method for establishing a classification relationship of claim 8 wherein each of said speech utterances is labeled with a one of said predetermined set of tasks to which each said utterance is directed.

11. The method for establishing a classification relationship of claim 8 wherein said speech utterances are generated in response to a query of the form "How may I help you?".

* * * * *